(No Model.)
A. JELINEK.
BREAD OR CHEESE CUTTER.
No. 280,480. Patented July 3, 1883.
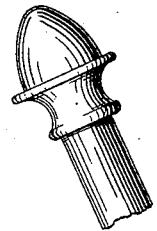
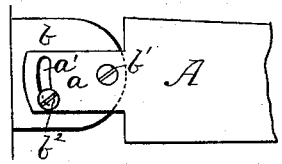
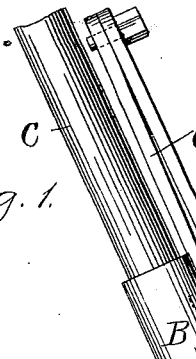
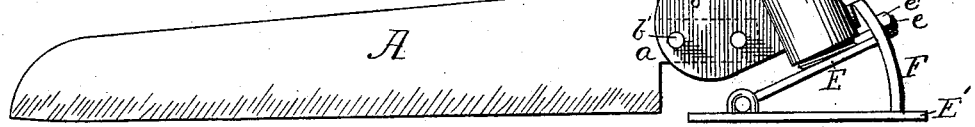
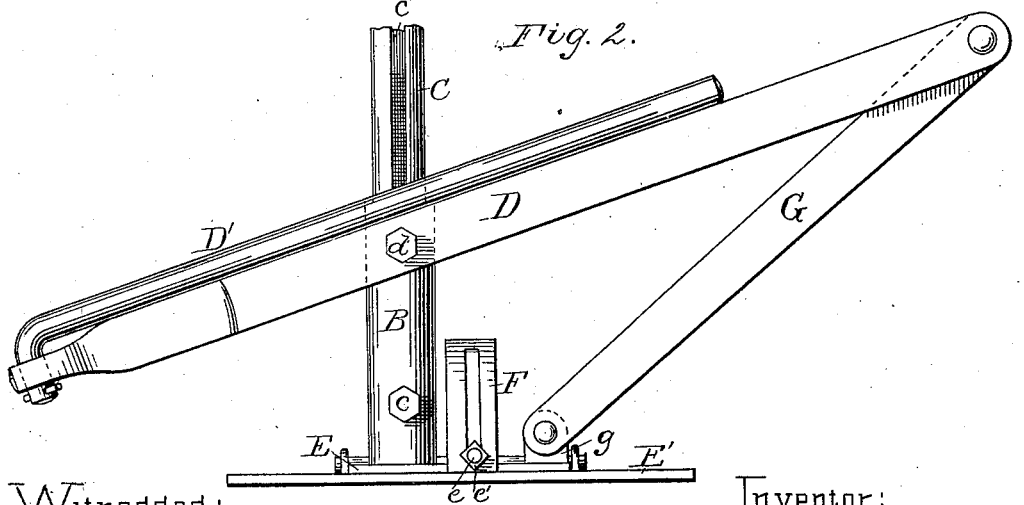
Witnesses:
Frank D. Thomason
Charles H. Schoff
Inventor:
Anton Jelinek
by Coyner & Co.
Atty

UNITED STATES PATENT OFFICE.

ANTON JELINEK, OF CHICAGO, ILLINOIS, ASSIGNOR OF ONE-HALF TO JAMES A. CRAIG, OF SAME PLACE.

BREAD OR CHEESE CUTTER.

SPECIFICATION forming part of Letters Patent No. 280,480, dated July 3, 1883.

Application filed May 6, 1882. (No model.)

*To all whom it may concern:*

Be it known that I, ANTON JELINEK, of Chicago, in the county of Cook and State of Illinois, have invented certain new and useful Improvements in Bread or Cheese Cutters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to cut bread, or, if desired, cheese, rapidly and with little or no effort. This I accomplish by means of a large bread or cheese knife, the shank of which is pivoted to a lug projecting from a vertically-reciprocating sleeve, and set at an any desired angle to the same by means of set-screws. The sleeve moves and is lifted or lowered on a vertical rod or shaft by a lever, which is fulcrumed to the same, and which is pivoted at one end to another lever, so as to form a knee or toggle joint. The shaft is secured to a hinged plate, which can be maintained in any desired position, substantially as described in the following specification, and illustrated in the drawings, in which—
Figure 1 is a front elevation of my invention. Fig. 2 is an end elevation of the same. Fig. 3 is a detail view of knife-shank and lug.

In the drawings, A is a large cheese or bread knife, having a shank, $a$, which is secured to a lug, $b$, by two set-screws, $b'$ and $b^2$, the screw $b'$, situated in or near the outer extremity of the same, serving as the pivotal center of the knife, and the other, $b^2$, passing through a segmental slot, $a'$, into said lug. Said slot describes a part of a circle struck from the aforesaid pivotal center, and is so made that when the sleeve moves vertically and obliquely, as will be hereinafter described, the knife can be adjusted so that its cutting-edge will be on a horizontal line. The lug $b$ projects from a sleeve, B, which moves vertically or obliquely on an upright rod or shaft, C. On the side directly opposite the lug it is provided with a set-screw, $c$, which, passing through the same, enters a slot, $c'$, in the contiguous side of the shaft C. This serves as a guide for the sleeve, and prevents any lateral oscillation of the knife. Immediately above the screw is a suitable projection, having in it a perforation to receive the screw $d$, which serves as a fulcrum for the lever D. This screw may be made longer, if desired, so as to enter the slot in the shaft, and thus dispense with the lower screw, $c$. The vertical shaft is rigidly secured to a plate, E, hinged, on the side nearest the knife, to the bed-plate E'. This device is resorted to so as to give any desired inclination to the vertical shaft, so as to obtain an oblique cut. It is maintained at any desired incline by a bolt, or, if preferable, an extension, $e$, projecting laterally from said plate E, which passes through a suitable slot in the segmental or U-shaped arm F, projecting from the bed-plate, and is secured by a thumb-screw, $e'$, on the end thereof. The lever D, fulcrumed to the sleeve, as hereinbefore stated, is provided at one end with a handle; or, if preferred, it may be perforated, as shown in Fig. 2, to receive the auxiliary lever D'. This auxiliary lever may be swung back, so as to rest upon the lever D. The other end of the lever D is pivoted to the bar G, which is pivoted at its other end to a lug, $g$, projecting from the hinged plate. Said lever and bar form what is commonly called a "knee" or "toggle" joint.

The above-described machine is adapted to cut either cheese or bread, the latter of which requires a drawing or oblique cut. To obtain this I incline the shaft at a proper angle, and there secure it by the thumb-screw and bolt, in the manner hereinbefore specified, and then adjust the knife until the edge of the same is on a horizontal line. By working the lever the desired cut is obtained. By returning the knife and shaft to their original positions the machine will make a vertical cut, which is preferred for cheeses.

It will be understood that the bed-plate is secured to its resting-place by screws, and it may be of any desired shape, so as to be capable of adjustment to any desired place.

What I claim as new, and desire to secure by Letters Patent, is—

1. A cheese or bread knife having a shank pivoted to a lug by a set-screw, which passes through a suitable perforation in the same, and having a segmental slot struck from said pivotal center, and which has passing through it into said lug, a set-screw so that the knife can be set at any angle within the extremes of said slot, substantially as described.

2. The combination, with the pivoted knife, of a sleeve, and an adjustable shaft capable of being set vertically or obliquely in an incline toward said knife, upon which said sleeve moves, substantially as described.

3. The combination, with a vertical shaft secured to a plate which is hinged to a bed-plate, of a bolt or extension screw-threaded on the outer end, extending laterally from said hinged plate and passing through a slot in a segmental or U-shaped arm, and maintained in any desired position by a thumb-screw on the end thereof, and said segmental or U-shaped slotted arm secured to or made in one piece with the bed-plate, as and for the purpose specified.

4. The combination, with a sleeve moving vertically or obliquely up and down on a shaft, of a lever fulcrumed to the side thereof, which is provided at one end with a handle, and pivoted at the other to a bar, so as to form a toggle or knee joint, said bar being pivoted at its other end to a lug projecting from the hinged plate in the manner shown, as and for the purpose specified.

5. A bread or cheese cutter consisting of a knife pivoted to a lug, said lug secured to a sleeve, said sleeve moving in a vertical direction on a shaft, said shaft secured to a plate hinged to the bed-plate, and maintained in any desired angle by a bolt passing through a slot in an arm and secured by a thumb-screw, a lever fulcrumed to the side of the sleeve, one end of which serves as a handle, the other end being pivoted to a bar to form a knee or toggle joint, and said bar pivoted to a lug projecting from the hinged plate or bed-plate, substantially as and for the purpose hereinbefore described and set forth.

In testimony that I claim the foregoing as my own I hereunto affix my signature in presence of two witnesses.

ANTON JELINEK.

Witnesses:
JAMES H. COYNE,
FRANK D. THOMASON.